(12) United States Patent
Devasthali et al.

(10) Patent No.: US 10,701,004 B2
(45) Date of Patent: Jun. 30, 2020

(54) SIMULATING EXECUTABLE OBJECTS INCLUDED IN ELECTRONIC MESSAGES

(71) Applicant: International Business Machines Corporation, Armonk, NY (US)

(72) Inventors: Snehal S. Devasthali, Pune (IN);
Girish Padmanabhan, Pune (IN);
Maitreyee M. Patukale, Pune (IN);
Prasad P. Purandare, Pune (IN)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 15/264,925

(22) Filed: Sep. 14, 2016

(65) Prior Publication Data

US 2017/0222957 A1    Aug. 3, 2017

Related U.S. Application Data

(63) Continuation of application No. 15/008,563, filed on Jan. 28, 2016, now Pat. No. 10,178,058.

(51) Int. Cl.
*G06F 15/16* (2006.01)
*H04L 12/58* (2006.01)

(52) U.S. Cl.
CPC .......... *H04L 51/046* (2013.01); *H04L 51/02* (2013.01); *H04L 51/04* (2013.01); *H04L 51/10* (2013.01); *H04L 51/18* (2013.01)

(58) Field of Classification Search
CPC ........ H04L 29/06394; H04L 29/06408; H04L 51/046; H04L 51/08; H04L 51/18; H04L 65/4007; H04L 65/4023; G06F 3/0481; G06F 3/04842; G06F 17/30979; G06F 17/24

See application file for complete search history.

(56) References Cited

U.S. PATENT DOCUMENTS 5,913,033 A    6/1999  Grout
6,463,149 B1 * 10/2002  Jolissaint ................ H04L 29/06
                                                    379/210.01

(Continued)

OTHER PUBLICATIONS

Devasthali et al., "Supporting Reference-Based Communication in Instant Messaging Systems ", U.S. Appl. No. 15/008,563, filed Jan. 28, 2016, 37 pages.

(Continued)

*Primary Examiner* — Lance Leonard Barry
(74) *Attorney, Agent, or Firm* — Maeve M. Carpenter

(57) ABSTRACT

Techniques for simulating executable objects included in electronic messages are provided. An electronic message including a button in a captured portion of a dialog box is received. The captured portion is presented on a user interface. A query for data that is associated with the dialog box is sent to a database. Based on extracted information received in response to the query, a response that is associated with a click on the button is simulated based on an interaction with the captured portion. The electronic message is modified on the user interface based on the simulated response. The modification(s) present the captured portion on the user interface such that the captured portion includes details relating to a subject of the dialog box based on the simulated response.

6 Claims, 8 Drawing Sheets

(56) References Cited

U.S. PATENT DOCUMENTS

| | | | | |
|---|---|---|---|---|
| 7,373,603 | B1* | 5/2008 | Yalovsky | G06F 9/543 |
| | | | | 709/203 |
| 8,001,187 | B2 | 8/2011 | Stochosky | |
| 8,073,830 | B2* | 12/2011 | Fontes | G06F 17/30864 |
| | | | | 707/706 |
| 8,365,081 | B1* | 1/2013 | Amacker | G06Q 10/10 |
| | | | | 705/27.1 |
| 8,621,581 | B2* | 12/2013 | Goyal | H04L 51/12 |
| | | | | 709/229 |
| 9,208,135 | B1* | 12/2015 | Lopez | G06F 17/2247 |
| 9,317,470 | B1* | 4/2016 | Raley | G06F 15/167 |
| 2005/0004995 | A1* | 1/2005 | Stochosky | H04L 12/1813 |
| | | | | 709/219 |
| 2005/0234850 | A1* | 10/2005 | Buchheit | G06Q 10/10 |
| 2006/0236252 | A1* | 10/2006 | Brychell | G06F 9/451 |
| | | | | 715/762 |
| 2006/0277322 | A1 | 12/2006 | Liu | |
| 2007/0239662 | A1* | 10/2007 | Fontes | G06F 17/30864 |
| 2007/0240203 | A1* | 10/2007 | Beck | G06F 21/33 |
| | | | | 726/4 |
| 2008/0270886 | A1* | 10/2008 | Gossweiler | G06F 3/0483 |
| | | | | 715/227 |
| 2010/0229127 | A1* | 9/2010 | Williams | G06F 3/0482 |
| | | | | 715/854 |
| 2010/0293449 | A1* | 11/2010 | Thanu | G06F 17/246 |
| | | | | 715/217 |
| 2011/0202847 | A1* | 8/2011 | Dimitrov | G06F 3/0481 |
| | | | | 715/738 |
| 2011/0247042 | A1* | 10/2011 | Mallinson | G06F 17/30026 |
| | | | | 725/86 |
| 2014/0189576 | A1* | 7/2014 | Carmi | G06F 3/0481 |
| | | | | 715/781 |
| 2014/0236958 | A1 | 8/2014 | Vaughn | |
| 2014/0372540 | A1 | 12/2014 | Libin | |
| 2015/0381532 | A1* | 12/2015 | Bhatia | H04L 51/02 |
| | | | | 709/206 |

OTHER PUBLICATIONS

Appendix P, List of IBM Patents or Patent Applications Treated as Related, 2 pages, dated Jan. 5, 2017.

* cited by examiner

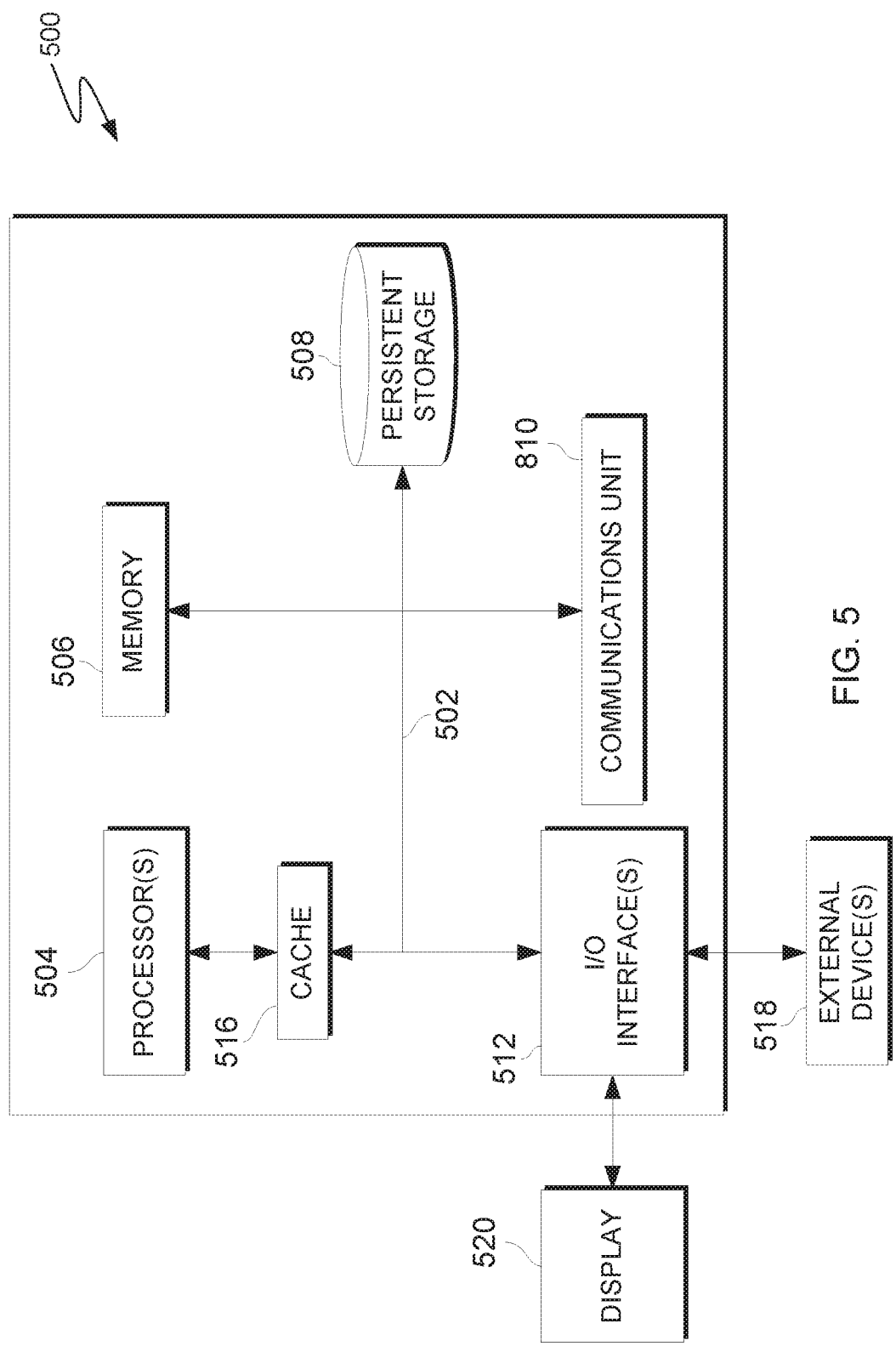

US 10,701,004 B2

SIMULATING EXECUTABLE OBJECTS INCLUDED IN ELECTRONIC MESSAGES

CROSS-REFERENCE TO RELATED APPLICATIONS

This application is a continuation of U.S. patent application Ser. No. 15/008,563 filed on Jan. 28, 2016 and issued as U.S. Pat. No. 10,178,058 on Jan. 8, 2019.

TECHNICAL FIELD

The present invention relates generally to the field of electronic messaging and, more particularly, to supporting reference-based communication in instant messaging systems.

BACKGROUND

Instant messaging (IM) is a type of communication that offers real-time text transmission over a network, such as the internet. Short messages including one or both of text and images are typically transmitted bi-directionally between two parties. Some IM applications can use push technology to provide real-time text, which transmits messages character by character, as they are composed. Instant messaging systems tend to facilitate connections between specified known users (often using a contact list also known as a "buddy list" or "friend list"). Depending on the IM protocol, the technical architecture can be peer-to-peer (i.e., direct point-to-point transmission) or client-server (i.e., where a central server retransmits messages from the sender to the communication device). More advanced instant messaging can add file transfer, clickable hyperlinks, Voice over Internet Protocol (VoIP), or video chat functionality.

SUMMARY

According to one embodiment of the present invention, a method for supporting reference-based communication in instant messaging systems is provided. The method includes: receiving, by one or more computer processors, an electronic message that includes a captured portion of a reference; presenting by one or more computer processors, the captured portion of the reference on a user interface; sending to a database, by one or more computer processors, a query for data that is associated with the reference, and in response, receiving, by one or more computer processors, extracted information based on the query; and on the user interface, modifying, by one or more computer processors, the electronic message based on the extracted information and an interaction with the captured portion of the reference.

According to another embodiment of the present invention, a computer program product for supporting reference-based communication in instant messaging systems is provided. The computer program product comprises a computer readable storage medium and program instructions stored on the computer readable storage medium. The program instructions include: program instructions to receive an electronic message that includes a captured portion of a reference; program instructions to present the captured portion of the reference on a user interface; program instructions to send, to a database, a query for data that is associated with the reference, and in response, receiving, by one or more computer processors, extracted information based on the query; and program instructions to, on the user interface, modify the electronic message based on the extracted information and an interaction with the captured portion of the reference.

According to another embodiment of the present invention, a computer system for supporting reference-based communication in instant messaging systems is provided. The computer system includes one or more computer processors, one or more computer readable storage media, and program instructions stored on the computer readable storage media for execution by at least one of the one or more processors. The program instructions include: program instructions to receive an electronic message that includes a captured portion of a reference; program instructions to present the captured portion of the reference on a user interface; program instructions to send, to a database, a query for data that is associated with the reference, and in response, receiving, by one or more computer processors, extracted information based on the query; and program instructions to, on the user interface, modify the electronic message based on the extracted information and an interaction with the captured portion of the reference.

BRIEF DESCRIPTION OF THE DRAWINGS

FIG. 5 is a block diagram of components of a computing device executing operations for supporting reference-based communication in instant messaging systems, in accordance with an embodiment of the present invention.

DETAILED DESCRIPTION

Instant messaging is a useful technique for having discussions, requesting information, and passing on information. Embodiments of the present invention, however, recognize that a message received over an instant messaging system may not include enough information for the recipient to respond appropriately to the message (e.g., answer a question or forward a desired piece of information) without additional information from the sender. If the sender in unable to respond quickly, a loss of productivity, a delay in decision making, and/or an incorrect decision may occur. For example, the aforementioned situations may occur when a user goes offline after initiating a communication, when a user provides insufficient information, or when a user unable to make decision due to a lack of access to information. Embodiments of the present invention provide a capability for a recipient of an instant message to view information that is associated with a captured portion of a reference that is included in the instant message in response to detecting a request for additional information from the recipient.

Figure 1:
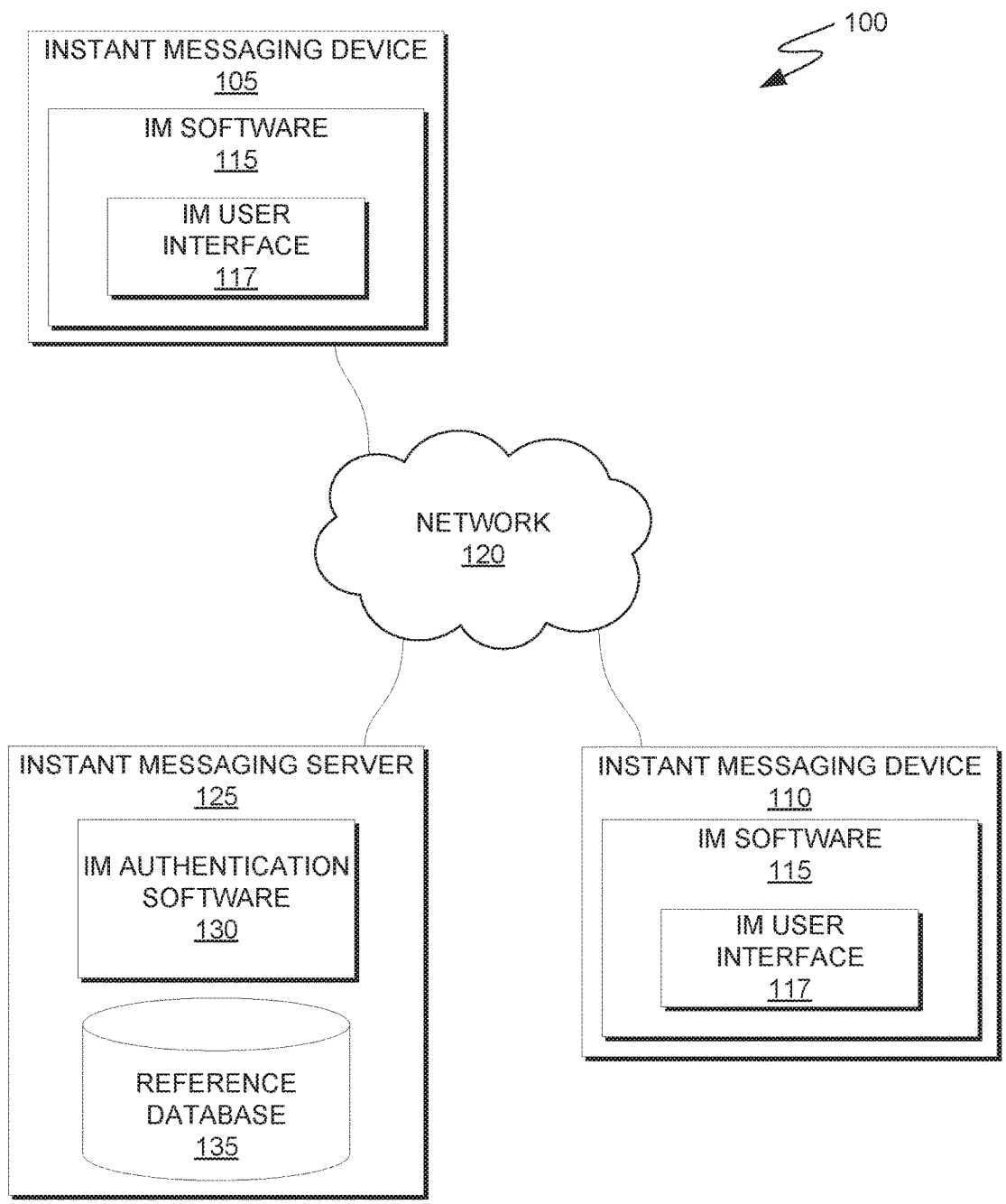
FIG. 1 is a functional block diagram illustrating a computing environment for supporting reference-based communication in instant messaging systems, in accordance with an embodiment of the present invention.

FIG. 1 is a functional block diagram illustrating a computing environment, in accordance with an embodiment of the present invention. For example, FIG. 1 is a functional block diagram illustrating computing environment 100. Computing environment 100 includes instant messaging device 105 (IM device 105), instant messaging device 110 (IM device 110), and instant messaging server 125 (IM server 125) connected over network 120. IM devices 105 and 110 execute instant messaging software 115 (IM Software 115). IM server 125 executes IM authentication software 130 and includes reference database 135.

In various embodiments, each of IM device 105 and IM device 110 is a computing device that can be a standalone device, a server, a laptop computer, a tablet computer, a netbook computer, a personal computer (PC), or a desktop computer. In another embodiment, each of IM device 105 and IM device 110 represents a computing system utilizing clustered computers and components to act as a single pool of seamless resources. In general, each of IM device 105 and IM device 110 can be any computing device or a combination of devices with access to one another, and with access to and/or capable of executing IM software 115. In embodiments like the one depicted in FIG. 1, IM devices 105 and 110 are client devices that are communicatively connected to IM server 125 via network 120. Each of IM device 105 and IM device 110 may include internal and external hardware components, as depicted and described in further detail with respect to FIG. 5. In some embodiments, IM device 105 and IM device 110 are the same type of computing device. In other embodiments, IM device 105 and IM device 110 are different types of computing devices.

In the embodiment depicted in FIG. 1, respective instances of IM software 115 are stored on IM device 105 and IM device 110. In other embodiments, one or both instances of IM software 115 may reside on another computing device, provided that each can access and is accessible by IM devices 105 and 110 respectively. In yet other embodiments, one or both instances of IM software 115 may be stored externally and accessed through a communication network, such as network 120. Network 120 can be, for example, a local area network (LAN), a wide area network (WAN) such as the Internet, or a combination of the two, and may include wired, wireless, fiber optic or any other connection known in the art. In general, network 120 can be any combination of connections and protocols that, in various embodiments, will support communications between IM devices 105 and 110 and IM server 125, in accordance with a desired embodiment of the present invention.

In various embodiments, IM software 115 provides a user interface, IM user interface 117, which executes locally on IM devices 105 and 110. IM user interface 117 further operates to receive user input from a user of a respective IM device via the provided user interface, thereby enabling the user to interact with the respective IM device via IM software 115. Additionally, IM user interface 117 provides a user interface that enables users of IM devices 105 and 110 to interact with each other via network 120. In various examples, the users interacts with IM software 115 in order to exchange one or more message that are associated with a reference, as described herein. Examples of IM user interface are discussed with respect to FIGS. 3A-4B.

Figure 2A:
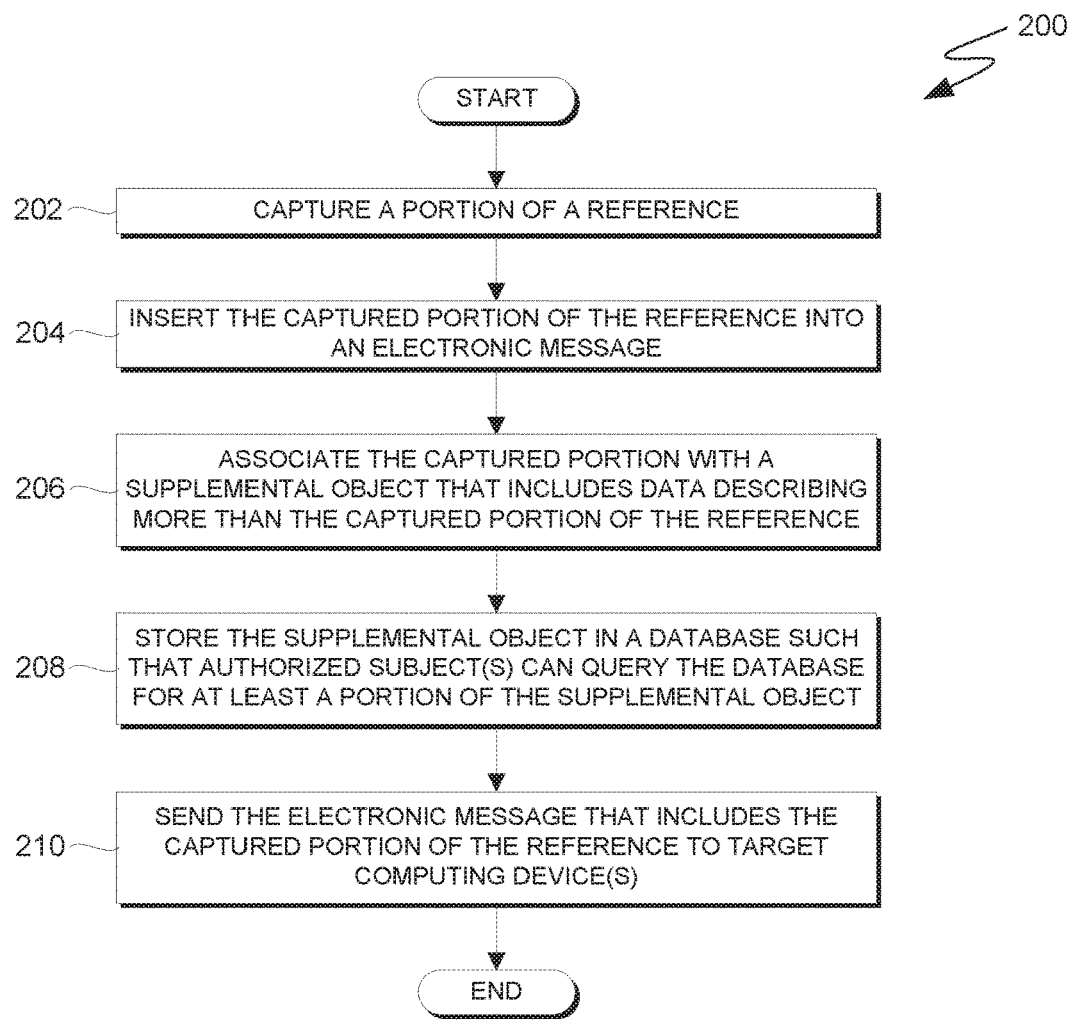
FIG. 2A is a flowchart depicting operations on a source computing device for supporting reference-based communication in instant messaging systems, on a computing device within the computing environment of FIG. 1, in accordance with an embodiment of the present invention.
Figure 2B:
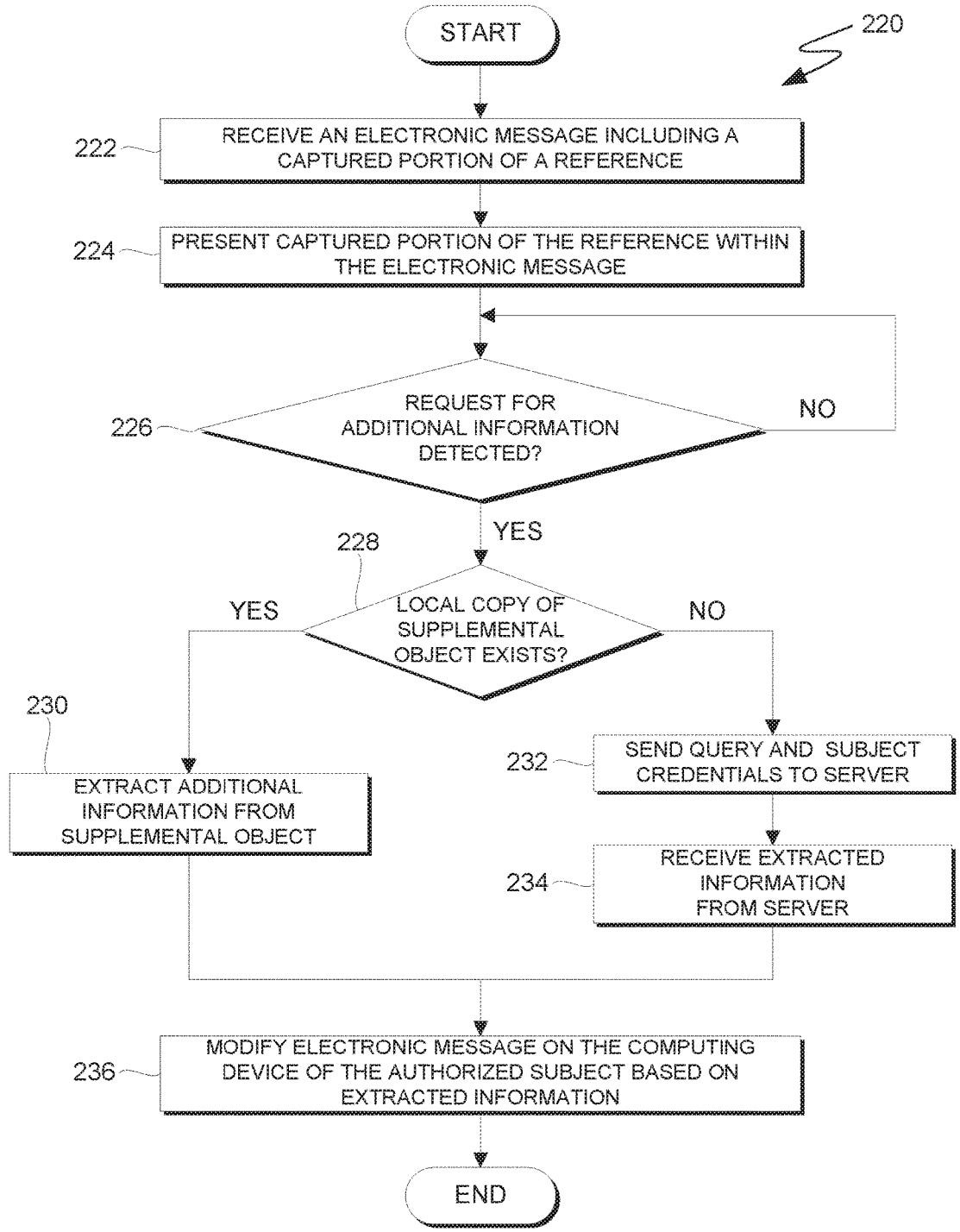
FIG. 2B is a flowchart depicting operations on a target computing device for supporting reference-based communication in instant messaging systems, on a computing device within the computing environment of FIG. 1, in accordance with an embodiment of the present invention.
Figure 3A:
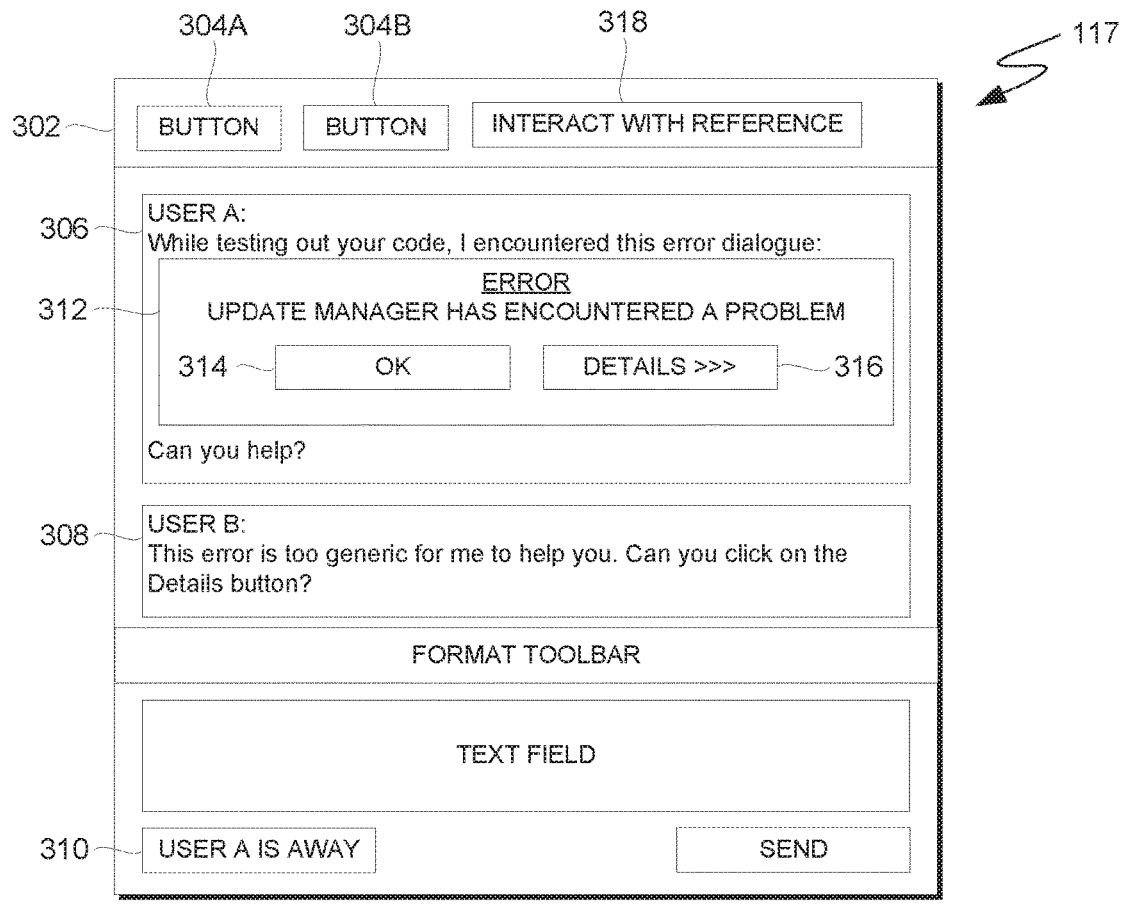
FIGS. 3A and 3B depict an embodiment of a user interface that enables a user of a target computer device to interact with a dialogue that is presented in an electronic message, in accordance with an embodiment of the present invention.
Figure 3B:
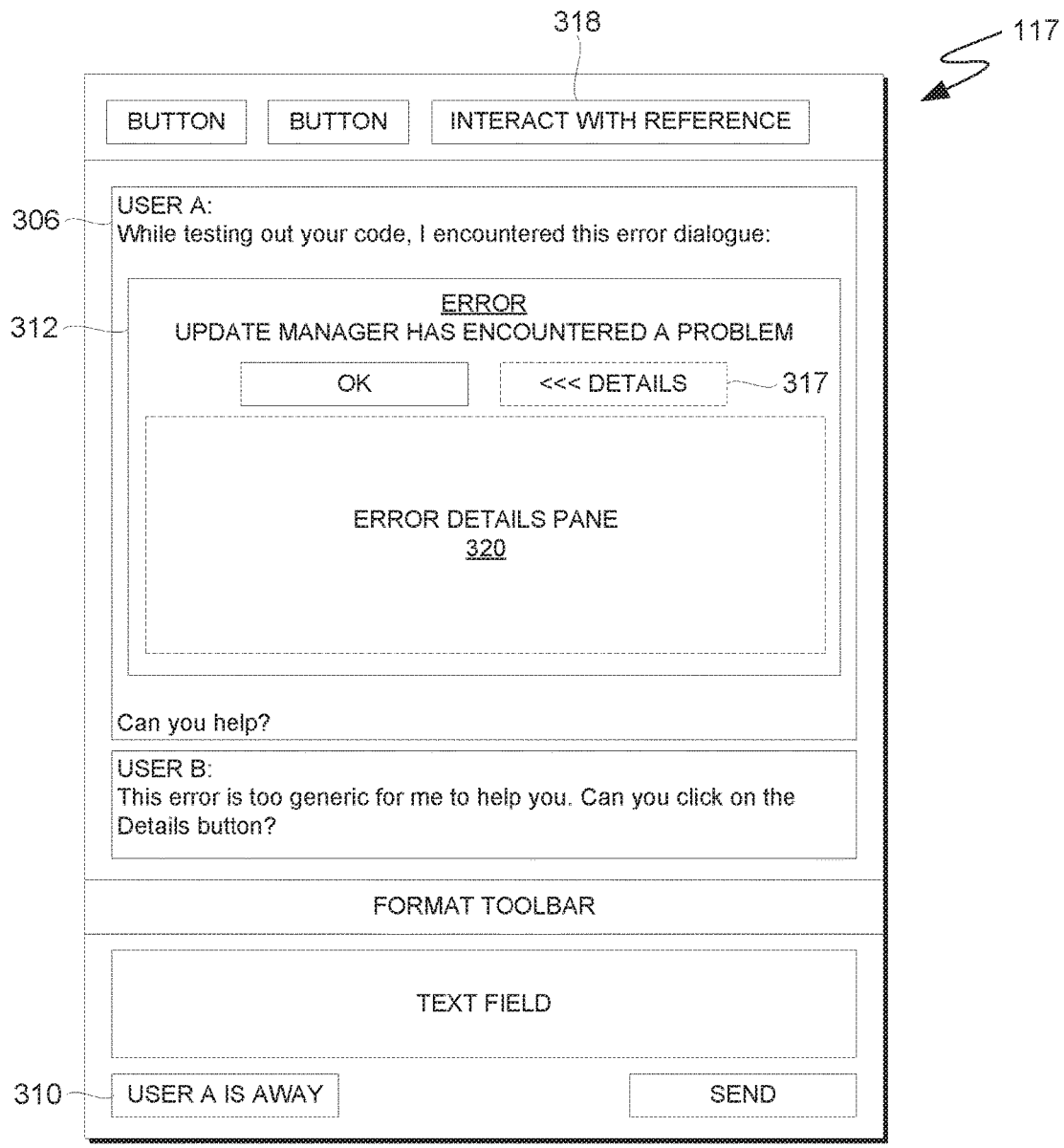
Figure 4A:
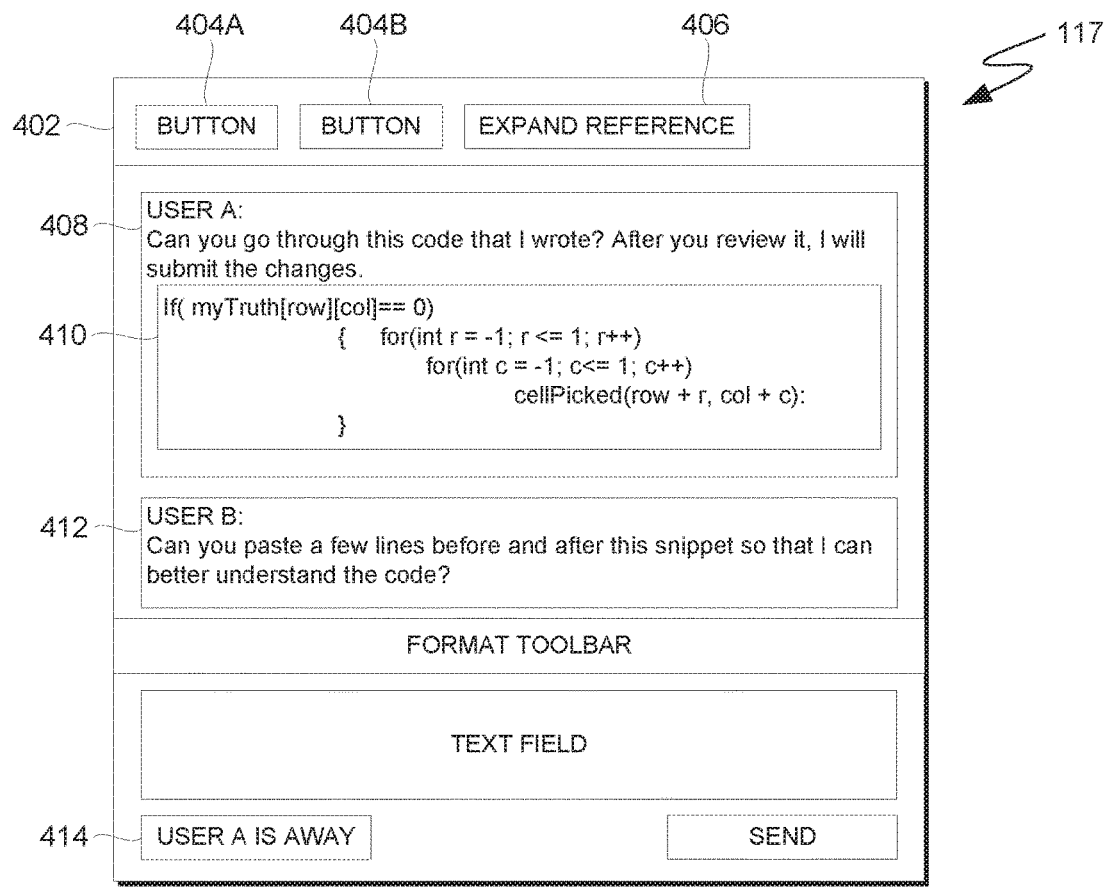
FIGS. 4A and 4B depict an embodiment of a user interface that enables a user of a target computer device to expand a captured portion of a reference that is presented in an electronic message, in accordance with an embodiment of the present invention.
Figure 4B:
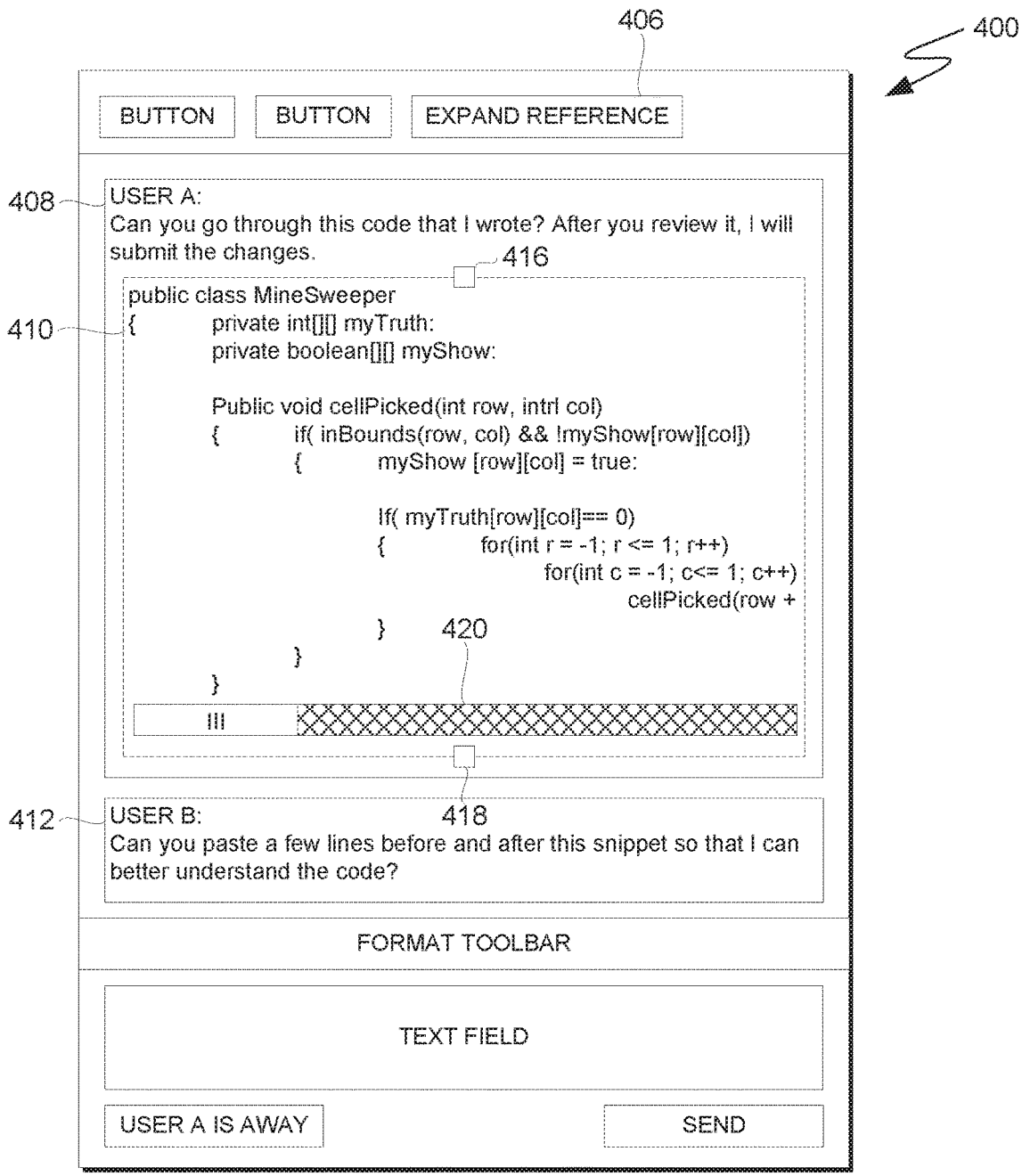

IM software 115 operates to send or receive electronic messages that include a portion of a reference, as described in greater detail with respect to FIGS. 2A and 2B. As used herein, a "reference" is any data object that is associated with and is presented, at least in part, in an electronic message (e.g., an IM or electronic mail ("email")). As used herein, a "source computing device" is a computing device that sends a message that includes a captured portion of a reference. Similarly, a "target computing device" is a computing device that receives the message that includes the captured portion of the reference. As depicted in FIGS. 3A-4B, various embodiments of IM software 115 enable a user of a source computing device to "capture" a portion of a reference. In some embodiments, "capturing" describes taking a snapshot of a reference (e.g., taking a screenshot that includes a dialogue window, in which the dialogue is the reference, as depicted in FIGS. 3A and 3B) and inserting the snapshot into an electronic message. In other embodiments, "capturing" describes copying and pasting a portion of a file into an electronic message (e.g., pasting a portion of a text file, as an object, into an IM, in which the text file is the reference, as depicted in FIGS. 4A and 4B). In various embodiments, a user of a target computing device can use IM software 115, in cooperation with at least one of IM server 125 and an instance of IM software 115 executing on the source computing device to obtain more information from the reference than is available through the captured portion.

Persons of ordinary skill in the art will understand that any one computing device (e.g., IM device 110) may be both a target computing device and source computing device over the course of a conversation conducted via various IM protocols, email protocols, or other types of electronic communication. Accordingly, an instance of IM software 115 can, with respect to a first message, provide the functionality described with respect to an instance of IM software 115 executing on a source computing device and, with respect to a second message, provide the functionality described with respect to an instance of IM software 115 executing on a target computing device.

In the embodiment depicted in FIG. 1, IM Server 125 is a computing device that can be a standalone device, a server, a laptop computer, a tablet computer, a netbook computer, a personal computer (PC), or a desktop computer. In another embodiment, IM server 125 represents a computing system utilizing clustered computers and components to act as a single pool of seamless resources. In general, IM Server 115 can be any computing device or a combination of devices with access to IM device 105 and IM device 110, and with access to and/or capable of executing IM authentication software 130. In various embodiments, IM server 125 includes reference database 135. IM server 125 may include internal and external hardware components, as depicted and described in further detail with respect to FIG. 5.

In various embodiments, IM authentication software 130 is stored on IM server 125. In other embodiments, IM authentication software 130 can reside on another computing device, provided that IM authentication software 130 and IM server 125 can access and are accessible by each other, and provided that IM devices 105 and 110 can access IM authentication software 130 while executing IM software 115. In yet other embodiments, IM authentication software 130 can be stored externally and accessed through a communication network, such as network 120.

In the embodiment depicted in FIG. 1, IM authentication software 130 operates to receive data that, at least in part, describes a reference that is associated with a message sent from a source computing device (e.g., IM device 105). IM authentication software 130 stores the received data in reference database 135. In various embodiments, the received data can include one or both of data and metadata that describe one or more requirements for accessing a reference stored in reference database 135. For example, IM authentication software 130 can receive data describing various authorized subjects (e.g., a user of a target computing device, such as IM device 110) and/or various rules for implementing an access control system, such as a mandatory access control system, a role-based access control system, a discretionary access control system, or another type of access control system known in the art. Upon receiving credentials that describe a subject from a target computing device (e.g., credentials of a user of IM device 110) and a query for data describing, at least in part, a reference stored in reference database 135, IM authentication software 130 authenticates the credentials and determines whether or not the subject is authorized to receive the data. If the subject is authorized to receive the data, IM authentication software 130 transmits the data to the target computing device.

Reference database 135 is a data repository that may be written to and read by one or both of IM authentication software 130 and various instances of IM software 115. Data describing one or more references and data associated with one or more access control policies can be stored to reference database 135. In some embodiments, reference database 135 can be written to and read by programs and entities outside of computing environment 100 in order to populate the repository with data describing various authorized subject(s) and/or access control rules.

Persons of ordinary skill in the art will understand that instant messaging services and various other forms of electronic messaging can utilize peer-to-peer or client-server architectures. The embodiment of computing environment 100 depicted in FIG. 1 utilizes a client-server architecture to, at least in part, support reference-based communication between IM devices 105 and 110. Other embodiments of computing environment 100, however, utilize a peer-to-peer architecture in which IM software 115 and IM device 105 and/or IM device 110 can respectively include the features and capabilities described with respect to IM authentication software 130 and IM server 125 (e.g., embodiments in which the instance of IM software 115 executing on the source computing device provides the functionality of IM authentication software 130).

FIG. 2A is a flowchart depicting operations on a source computing device for supporting reference-based communication in instant messaging systems, on a computing device within the computing environment of FIG. 1, in accordance with an embodiment of the present invention. More specifically, FIG. 2A depicts operations 200 of an instance of IM software 115 that is executing on IM device 105 (i.e., a source computing device).

In operation 202, IM software 115 captures a portion of a reference. In some embodiments, IM software 115 includes various features that are analogous to the features of a screenshot tool. For example, a user of IM device 105 can take a screenshot that includes a dialogue box, a portion of a text file, a portion of a spreadsheet, or a screenshot of various other objects that are presented on IM user interface 117 of IM device 105. In other embodiments, IM software 115 provides one or both of the aforementioned features and the ability to copy a portion of a reference. In one example, a user of IM device 105 can "left-click" on a page of a word processing document, a page of a portable document format file (PDF file), a page of a spreadsheet, a dialogue box, or another portion of an object (i.e., a reference) that is presented, at least in part, on IM user interface 117 of IM device 105 to open a menu that provides an option to "copy," and thus capture, the portion of the object. In another example, a user of IM device 105 can use a cursor to select a portion of an object (i.e., a reference) that is presented on IM user interface 117 of IM device 105 and similarly "copy" the selected portion.

In operation 204, IM software 115 inserts the captured portion of the reference into an electronic message. For example, in operation 204 a user of IM device 105 can paste a screen shot of a portion of a reference or paste a copied portion of a reference into a data entry field that is presented on IM user interface 117 of IM device 105 (e.g., a chat window of an IM application, such as IM software 115 or any field that can present one or both of text and images).

In operation 206, IM software 115 associates the captured portion of the reference with a supplemental object that includes more information that is associated with the reference than the captured portion of the reference. In some embodiments, the supplemental object is a copy of the reference. If, for example, the user of IM device 105 captures a portion of a word processing file or a spreadsheet file via IM software 115, IM software 115 associates the word processing file or the spreadsheet file with the captured portion in order to provide the functionality described herein with respect to an instance of IM software 115 that is executing on a target computing device (e.g., on IM device 110). One such example is discussed in greater detail with respect to FIGS. 4A and 4B. In other embodiments, the supplemental object is code and/or data that, when executed by an instance of IM software 115 executing on a target computing device, simulates, at least in part, an application and/or graphical user interface element (GUI element) that was captured, at least in part, via an instance of IM software 115 executing on a source computing device (e.g., on IM device 105). If, for example, the user of IM device 105 captures a dialogue box via IM software 115, IM software 115 associates the captured portion of the reference (e.g., the dialogue box as presented on the source computing device during operation 202) with code and data that, when executed by an instance of IM software 115 executing on IM device 110, enables the user of IM device 110 to interact with the dialogue in a similar manner to the user of IM device 105. One such example is discussed in greater detail with respect to FIGS. 3A and 3B.

In operation 208, IM software 115 stores the supplemental object that is associated with the captured portion of the reference in a database such that recipients of messages including captured portions of references can query the database for at least portions of the supplemental objects (i.e., additional data describing the references). In some embodiments, IM software 115 sends data describing the supplemental object to IM server 125 in operation 208. In other embodiments, IM software 115 stores data describing the supplemental object to the source computing device (e.g., IM device 105) or, if such data is stored on the source computing device, makes such data available to authorized subject(s) in response to a query for at least a portion of the supplemental object. Persons of ordinary skill in the art will understand that, in such embodiments, the data may not be available to the authorized subject(s) if the source computing device is not communicatively connected to the target computing device (e.g., if a user of IM device 105 "logs off"

from an IM application or IM device 105 is not connected to network 120 when a query is sent). In yet other embodiments, IM software 115 sends data describing the supplemental object to the target computing device (e.g., IM device 110) in operation 208 to enable the target computing device to create a local copy of the data describing the supplemental object. In various embodiments, IM software 115 also associates data describing one or more access control rules and one or more authorized subjects with the supplemental object such that only the authorized subject(s) can access the data describing the supplemental object. In some embodiments, the one or more access control rules identify a recipient of an electronic message that contains the captured portion of the reference (e.g., an IM or email) as an authorized subject such that a mandatory access control policy will permit the recipient to access data describing the supplemental object. In other embodiments, the one or more access control rules identify a class of subjects (e.g., technical support specialists) such that a role-based access control policy will permit a recipient of the message who is also a member of the class to access data describing the supplemental object.

In operation 210, IM software 115 sends the electronic message that includes the captured portion of the reference to one or more target computing device(s). In some embodiments, IM software 115 sends the electronic message directly to computing device(s) that are associated with the authorized subject(s) (e.g., IM device 110 or a server that members of a class of authorized subjects can access from one or more computing devices executing instances of IM software 115). In other embodiments, IM software 115 sends the electronic message to the authorized subject(s) via one or more intermediate computing nodes in accordance with various IM protocols, email protocols, or another set of electronic messaging protocols known in the art.

FIG. 2B is a flowchart depicting operations on a target computing device for supporting reference-based communication in instant messaging systems, on a computing device within the computing environment of FIG. 1, and in accordance with an embodiment of the present invention. More specifically, FIG. 2B depicts operations 220 of an instance of IM software 115 that is executing on IM device 110 (i.e., a target computing device). Persons of ordinary skill in the art will understand that operations 220 can also represent operations of IM software 115 executing on IM device 105 in response to receiving an electronic message from IM device 110 (i.e., IM device 105 can be a source computing device with respect to a first message and a target computing device with respect to a second message).

In operation 222, an instance of IM software 115 that is executing on a target computer device (e.g., IM device 110) receives an electronic message including a captured portion of a reference from a source computing device. IM user interface 117 presents the captured portion of the reference within the received electronic message (operation 224).

In decision 226, IM software 115 determines whether or not a request for additional information is detected. In some embodiments, a request for additional information can be made and detected through interactions with the captured portion of the reference if the captured portion includes, for example, interactive graphical elements such as buttons, text boxes, list boxes or other interactive graphical elements known in the art. In other embodiments, a request for additional information can be made and detected through interactions with an object of IM user interface 117 (e.g., a toolbar button) in order to extract more information from the reference than is available through the captured portion. In yet other embodiments, a request for additional information can be made through either of the aforementioned techniques based on the type of reference that is associated with the captured portion (e.g., whether or not the reference is an interactive dialogue or a text file).

If IM software 115 does not detect a request for additional information (decision 226, NO branch), a subroutine of IM software 115 monitors IM user interface 117 until it detects a request for additional information or execution of IM software 115 is terminated. In various embodiments, IM software 115 permits a user of IM device 110 (i.e., a user of a target computing device) to send and receive messages while the subroutine monitors IM user interface 117 for requests for additional information regarding captured portion(s) of one or more references.

If IM software 115 detects a request for additional information (decision 226, YES branch), IM software 115 determines if a local copy of the supplemental object exists. For example, IM software 115 can determine that a local copy of the supplemental object exists (i) when the target computing device receives a copy of the supplemental object from the source computing device or (ii) based on metadata indicating that the supplemental object is associated with data and/or code that exists locally. If IM software 115 determines that a local copy of the supplemental object exists (decision 228, YES branch), IM software 115 extracts additional information from the supplemental object based, at least in part, on the nature of the request, as discussed with respect to FIGS. 3A-4B (operation 230). If IM software 115 determines that a local copy of the supplemental object does not exist (decision 228, NO branch), IM software 115, in operation 232, sends (i) a query for the additional information and (ii) subject credentials (e.g., credentials associated with a user of IM device 110) to a computing device that includes a data repository that stores data that describes the supplemental object (e.g., reference database 135 on IM server 125 or a source computing device, such as IM device 105, based on the architecture of computing environment 100). As described herein, some embodiments permit only authorized subject(s) to access the data that describes the supplemental object. In such embodiments, IM authentication software 130, for example, utilizes the credentials to authenticate the subject and determine whether or not the subject is authorized to receive the requested information. If the subject is authorized to receive the requested information, or if no access control features are implemented, IM software 115 receives (e.g., from IM server 125) information that was extracted from the supplemental object based, at least in part, on the query (operation 234).

In operation 236, IM software 115 modifies the electronic message that is presented on the target computing device (e.g., a message presented on IM user interface 117 of IM device 110) based on the additional information that was extracted from the supplemental object. In some embodiments, IM software 115 modifies the electronic message by adding interactive features of the reference to the captured portion of the reference, as discussed with respect to FIGS. 3A and 3B. In other embodiments, IM software 115 modifies the electronic message by expanding the captured portion of the reference such that the electronic message presents additional information from the reference, as discussed with respect to FIGS. 4A and 4B.

FIGS. 3A and 3B depict an embodiment of IM user interface 117 that enables a user of a target computer device to interact with a dialogue that is presented in an electronic message, in accordance with an embodiment of the present invention. More specifically, FIGS. 3A and 3B depict the functionality of IM user interface 117 in response to receiving, on a target computing device executing an instance of IM software 115, a message including an image of a dialogue box.

In the embodiment depicted in FIG. 3A, IM user interface 117 includes toolbar 302, which includes buttons 304A and 304B for controlling various aspects of IM software 115. In this depiction of IM user interface 117, "User A" is a user of IM device 105 (i.e., the source computing device) and "User B" is a user of IM device 110 (i.e., the target computing device). IM user interface 117 presents message 306, from User A, and message 308 from User B. Message 306 includes an image of dialogue box 312 and indicates that User A has encountered a problem related to dialogue box 312 and is requesting User B's assistance. As depicted in FIG. 3A, dialogue box 312 includes OK button 314 and details button 316. Message 308 indicates that User B cannot assist User A without knowing more about the error (i.e., without information that is available by clicking on details button 316). IM user interface 117, however, includes status indicator 310, which indicates that User A is "away" (i.e., unavailable) and thus cannot currently respond to User B's request for User A to click on details button 316. Because the image of dialogue box 312 depicted in Figure A is merely the captured portion of the reference (i.e., the reference is dialogue box 312 and the corresponding, executable code) and does not have the functionality of dialogue box 312, User B clicks on "interact with reference" button 318 to, as discussed with respect to FIG. 2B, instruct IM software 115 to query the database that stores the supplemental object and, based on information extracted from the supplemental object, modify message 306 such that User B can click on details button 316 to view additional information concerning the error. In other embodiments, IM software 115 automatically queries the database to identify any interactive features of a captured portion of a reference and, in response to identifying one or more interactive features, automatically modifies the captured portion such that the captured portion of the reference includes the identified, interactive features of the reference. In such embodiments, IM user interface 117 can omit "interact with reference button" 318.

FIG. 3B depicts IM user interface 117 of FIG. 3A after the instance of IM software 115 executing on IM device 110 simulates a click on details button 316 of dialogue box 312 in response to User B activating "interact with reference" button 318 and clicking on details button 316. Based on the simulation, IM software 115 modifies message 306 such that IM user interface 117 presents error details pane 320 (i.e., a result of simulating the click on details button 316) within the image of dialogue box 312. The dash pattern of error details pane 320 represents the change relative to image dialogue box 312 in FIG. 3A. Simulating the click on details button 316 also modifies details button 316, yielding details button 317 (i.e., "<<<" appearing to the left of "DETAILS" in details button 316, whereas ">>>" appears to the right of "DETAILS" in details button 316). The dash pattern of details button 317 represents the change relative to image dialogue box 312 in FIG. 3A. Even though status indicator 310 continues to indicate that User A is "away," User B is able to advantageously obtain additional information relating to the error from error detail pane 320 without having to wait for User A to return and perform the requested action.

FIGS. 4A and 4B depict an embodiment of IM user interface 117 that enables a user of a target computer device to expand a captured portion of a reference that is presented in an electronic message, in accordance with an embodiment of the present invention. More specifically, FIGS. 4A and 4B depict the functionality of IM user interface 117 in response to receiving, on a target computing device executing an instance of IM software 115, a message including a portion of code that was copied from a document (e.g., a text file) including additional code.

In the embodiment depicted in FIG. 4A, IM user interface 117 includes toolbar 402, which includes buttons 404A and 404B for controlling various aspects of IM software 115. In this depiction of IM user interface 117, "User A" is a user of IM device 105 (i.e., the source computing device) and "User B" is a user of IM device 110 (i.e., the target computing device). IM user interface 117 presents message 408, from User A, and message 412, from User B. Message 408 includes a portion of code that was copied (i.e., captured) from a document including additional code (i.e., the reference) and pasted, as object 410, into message 408. Message 408 indicates that User A is requesting that User B review the captured portion of code. Message 412 indicates that User B would like User A to include additional code to provide context for the captured portion of the code. Status indicator 414, however, indicates that User A is "away" (i.e., unavailable) and thus cannot currently respond to User B's request for additional code. To obtain the additional code, User B clicks on "expand reference" button 406 of toolbar 402.

FIG. 4B depicts IM user interface 117 of FIG. 4A after the instance of IM software 115 executing on IM device 110 registers a click on "expand reference" button 406 and User B utilizes IM user interface 117 to indicate the additional code that is desired. In response to registering a click on "expand reference" button 406, the embodiment of IM user interface 117 depicted in FIG. 4B modifies a border surrounding object 410 (e.g., modifies the stroke pattern of the border) to indicate that User B may drag handle 416 to reveal code prior to the captured portion of code and may drag handle 418 to reveal code following the captured portion of code. In response to IM user interface 117 registering movement of handle 416 or handle 418, IM software 115 queries the database that stores the supplemental object (e.g., reference database 135 of IM server 125) and, based on information extracted from the supplemental object, instructs IM user interface 117 to modify object 410 and message 408 in accordance with the movement of the respective handle and extracted information, as discussed with respect to FIG. 2B. In the embodiment, depicted in FIG. 4B, IM user interface 117 cannot concurrently present all of the captured portion of the code and all of the additional code. In this embodiment, IM user interface 117 provides a horizontal scroll bar (e.g., scroll bar 420) that is associated with object 410 to enable User B to selectively view various portions of object 410. In other embodiments, IM user interface 117 provides an analogous, vertical scroll bar to enable User B to selectively view various portions of object 410. In yet other embodiments, IM user interface 117 provides both a horizontal scroll bar and a vertical scrollbar to enable User B to selectively view various portion of object 410. Even though status indicator 414 continues to indicate that User A is "away," User B is able to advantageously obtain additional portions of the code without having to wait for User A to return and provide the requested information.

Persons of ordinary skill in the art will understand that the functionality described with respect to FIGS. 4A and 4B can be provided for various other documents, such as other types of word processing files, various types of spreadsheet files, PDF files, and various other types of documents. In other embodiments, for example, object 410 is a captured portion of a spreadsheet, and upon registering a click on "expand reference" button 406, IM user interface 117 provides a first pair of handles and a second pair of handles to respectively expose additional rows and additional columns of the spreadsheet. In such embodiments, IM user interface 117 can provide a horizontal scroll bar and a vertical scroll bar that are associated with object 410 to enable User B to selectively view various columns and rows of the captured portion of the spread sheet and the expanded portion of the spread sheet.

In addition persons of ordinary skill in the art will understand that the functionality described with respect to IM software 115, IM user interface 117, and IM server 125 are not limited to IM computing environments, such as computing environment 100. For example, email applications can advantageously include similar functionality in order to enable recipients of emails that include captured portions of references to obtain additional information relating to such references without requiring the participation of the user who sent the email that includes the captured portion of the reference.

FIG. 5 is a block diagram of components of a computing device, generally designated 500, in accordance with an embodiment of the present invention. In one embodiment, computing system 500 is representative of one or more of IM device 105, IM device 110, and IM server 125 within computing environment 100, in which case each of IM device 105 and IM device 110 includes IM software 115 and IM server 125 includes IM authentication software 130.

It should be appreciated that FIG. 5 provides only an illustration of one implementation and does not imply any limitations with regard to the environments in which different embodiments may be implemented. Many modifications to the depicted environment may be made.

Computing system 500 includes processor(s) 504, cache 516, memory 506, persistent storage 508, input/output (I/O) interface(s) 512, communications unit 510, and communications fabric 502. Communications fabric 502 provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of processor(s) 504 by holding recently accessed data, and data near recently accessed data, from memory 506.

Program instructions and data used to practice embodiments of the present invention may be stored in persistent storage 508 and in memory 506 for execution by one or more of the respective processor(s) 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computer system 500. For example, I/O interface(s) 512 may provide a connection to external device(s) 518 such as a keyboard, keypad, a touch screen, and/or some other suitable input device. External device(s) 518 can also include portable computer readable storage media such as, for example, thumb drives, portable optical or magnetic disks, and memory cards. Software and data used to practice embodiments of the present invention can be stored on such portable computer readable storage media and can be loaded onto persistent storage 508 via I/O interface(s) 512. I/O interface(s) 512 also connect to display 520.

Display 520 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for supporting reference-based communication in instant messaging systems, comprising:

receiving, by one or more computer processors, an electronic message that includes a captured portion of a reference, wherein in the reference is a dialogue box including a button;

presenting, by one or more computer processors, the captured portion of the reference on a user interface;

sending to a database, by one or more computer processors, a query for data that is associated with the reference, and in response, receiving, by one or more computer processors, extracted information based on the query;

simulating, by one or more computer processors, a response that is associated with a click on the button of the reference based on the extracted information and an interaction with the captured portion of the reference; and on the user interface, modifying, by one or more computer processors, the electronic message based on the extracted information and the interaction with the captured portion of the reference to present the captured portion of the reference on the user interface such that the captured portion of the reference includes details relating to a subject of the dialogue box based on the simulated response.

2. The method of claim 1, further comprising:
taking, by one or more computer processors, a screenshot of the dialogue box to capture the captured portion of the reference, wherein the screenshot of the dialogue box is the captured portion of the reference;
inserting, by one or more computer processors, the captured portion of the reference into the electronic message; and
associating, by one or more computer processors, the screenshot of the dialogue box with a portion of code that describes, at least in part, the simulated response, and wherein the simulated response is triggered by clicking on the button.

3. A computer program product for supporting reference-based communication in instant messaging systems, the computer program product comprising:
a computer readable storage device and program instructions stored on the computer readable storage device, the program instructions comprising:
program instructions to receive an electronic message that includes a captured portion of a reference, wherein the reference is a dialogue box including a button;
program instructions to present the captured portion of the reference on a user interface;
program instructions to send, to a database, a query for data that is associated with the reference, and in response, receiving, by one or more computer processors, extracted information based on the query;
program instructions to simulate a response that is associated with a click on the button of the reference based on the extracted information and an interaction with the captured portion of the reference; and
program instructions to, on the user interface, modify the electronic message based on the extracted information and the interaction with the captured portion of the reference to present the captured portion of the reference on the user interface such that the captured portion of the reference includes details relating to a subject of the dialogue box based on the simulated response.

4. The computer program product of claim 3, the program instructions further comprising:
program instructions to take a screenshot of the dialogue box to capture the captured portion of the reference, wherein the screenshot of the dialogue box is the captured portion of the reference;
program instructions to insert the captured portion of the reference into the electronic message; and
program instructions to associate the screenshot of the dialogue box with a portion of code that describes, at least in part, the simulated response, and wherein the simulated response is triggered by clicking on the button.

5. A computer system for supporting reference-based communication in instant messaging systems, the computer system comprising:
one or more computer processors;
one or more computer readable storage devices;
program instructions stored on the one or more computer readable storage devices for execution by at least one of the one or more processors, the program instructions comprising:
program instructions to receive an electronic message that includes a captured portion of a reference, wherein the reference is a dialogue box including a button;
program instructions to present the captured portion of the reference on a user interface;
program instructions to send, to a database, a query for data that is associated with the reference, and in response, receiving, by one or more computer processors, extracted information based on the query;
program instructions to simulate a response that is associated with a click on the button of the reference based on the extracted information and an interaction with the captured portion of the reference; and
program instructions to, on the user interface, modify the electronic message based on the extracted information and the interaction with the captured portion of the reference to present the captured portion of the reference on the user interface such that the captured portion of the reference includes details relating to a subject of the dialogue box based on the simulated response.

6. The computer system of claim 5, the program instructions further comprising:
program instructions to take a screenshot of the dialogue box to capture the captured portion of the reference, wherein the screenshot of the dialogue box is the captured portion of the reference;
program instructions to insert the captured portion of the reference into the electronic message; and
program instructions to associate the screenshot of the dialogue box with a portion of code that describes, at least in part, the simulated response, and wherein the simulated response is triggered by clicking on the button.

\* \* \* \* \*